Figure 1:
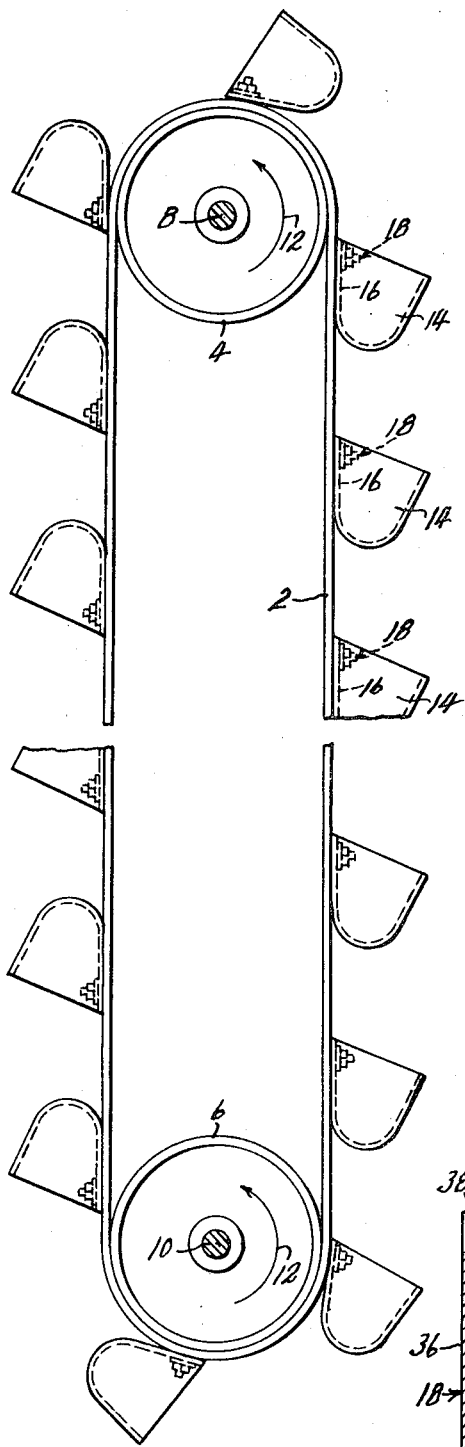

United States Patent
Corbett et al.

[11] 3,712,357
[45] Jan. 23, 1973

[54] BOLT FOR ATTACHING ELEVATOR BUCKETS TO BELTS, AND METHOD OF MAKING SAME

[75] Inventors: John M. Corbett, Kansas City; Joseph G. Schenk, Lee's Summit, both of Mo.

[73] Assignee: Belts, Bolts, Cups, Corporation, Kansas City, Mo.

[22] Filed: March 8, 1971

[21] Appl. No.: 122,034

[52] U.S. Cl. ................................151/41.73, 198/151
[51] Int. Cl. ..................................................F16b 39/00
[58] Field of Search ....................151/41.73; 198/151

[56] References Cited

UNITED STATES PATENTS 3,019,887  2/1962  Lowden..............................151/41.73
3,270,610  9/1966  Knowlton..........................151/41.73

*Primary Examiner*—Edward C. Allen
*Attorney*—John A. Hamilton

[57] ABSTRACT

A bolt for attaching elevator buckets to elevator belts, said bolt comprising a threaded shank adapted to receive a nut thereon, a broad shallow conical head integral and coaxial with said shank, and a pair of sharpened teeth of special shape carried by said head at diametrically opposite sides of and in spaced relation from said shank and extending from said head in the direction of said shank, and a method of forming each of said teeth consisting of cutting said head from the periphery thereof along a line acutely angled to the adjacent edge thereof, and forming a right angled bend along a line from the inner end of said cut to the adjacent edge of said head.

1 Claim, 6 Drawing Figures

PATENTED JAN 23 1973 3,712,357

INVENTORS.
John M. Corbett
Joseph G. Schenk
BY John A. Hamilton
Attorney.

BOLT FOR ATTACHING ELEVATOR BUCKETS TO BELTS, AND METHOD OF MAKING SAME

This invention relates to new and useful improvements in means for attaching elevator buckets to elevator belts, and has particular reference to a special bolt for this purpose.

While bolts are already commonly used to attach elevator buckets to belts, there are nevertheless several difficulties commonly associated with their use. For example, the bolt heads should be smoothly flush with the inner surface of the belt to avoid interference with or damage to the pulleys over which the belt is trained. Thus either the belt must be specially formed with recesses for the bolt heads, which is a prohibitively expensive procedure, or the bolt head must be specially formed. Thus the bolt heads, which must be of large diameter to provide the necessary bearing area against the belting material, usually rubber, are sometimes made with planar outer faces and conical inner faces, tapering to a thin, sharp peripheral edge. In this case, the outer surface of the head may be pulled flush with the belt surface by tightening the nut, but the thin peripheral edge is often so sharp that it cuts, gouges, or even pulls through the belt. This cutting of the belt by the bolt head, often called "thumbnailing," occurs particularly at the leading and trailing edges of the bolt head as the belt passes around a pulley since the belt flexes while the bolt head cannot, and often causes early failure of the belt and also of the bucket connection. Accordingly, an object of the present invention is the provision of a bolt of the character described which, while having a conically tapered head is sufficiently blunt at the peripheral edge of the head to avoid "thumbnail" cutting of the belt.

Also, the bolt cannot be allowed to rotate about its axis during the flexure of the belt in use, as often occurs if means are not provided to prevent it, since the resulting relative movement between the belt and bolt causes wearing away or cutting of the rubber, enlarging the bolt holes, and loosening the connections formed by the bolts. Barbs or teeth are sometimes applied to the bolt heads for biting into the rubber to prevent such rotation, but barbs or teeth of ordinary form often still permit bolt rotation, either during use or as the bolt is tightened, and in such cases the barbs or teeth themselves become "cutting tools" still further hastening the destruction of the belt. Accordingly, another object of the present invention is the provision of a bolt of the character described having teeth specially formed to resist bolt rotation effectively, said teeth for this purpose being generally planar with their planes generally radial to the bolt shank.

Also, the teeth of the bolt heads often "split" the warp of the fabric of belts including textile fabric impregnated in the rubber body of the belt, hastening the deterioration and failure of the belt. The present bolt prevents this occurrence by using only two teeth on the bolt head, with the understanding that when the bolt is applied, said teeth will be spaced apart laterally of the belt.

Also, in the use of bolts for this purpose, the bolt must fit very tightly in the hole punched therefor in the belt, as insurance against relative movement between the bolt and belt, and for this reason the hole is usually punched somewhat smaller than the bolt shank, and the bolt shank driven therein with substantial force. Under ordinary circumstances, it is difficult to determine if the belt is firmly seated about the base of the shank, or has merely been compressively deformed. The present bolt, accordingly, is provided with teeth of a special shape operable to apply a stretching force diametrically across the hole of the belt, enlarging said hole, at least temporarily, to allow the bolt shank to enter the hole completely.

Finally, it is a still further object of the present invention to provide a method or process of manufacture which will produce the teeth on the bolt heads in an extremely simple, economical manner, and which permits easy adjustment of the length, area, and extent of said teeth as may be desired.

Other objects are simplicity and economy of construction, and efficiency and dependability of operation.

Figure 2:
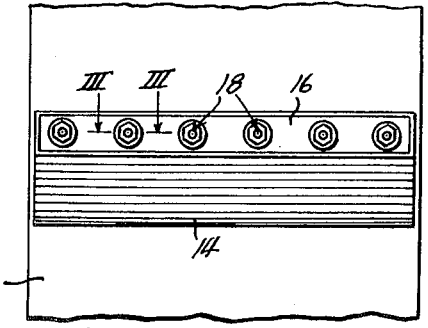
Figure 3:
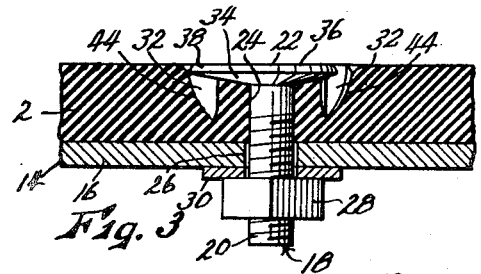
Figure 4:
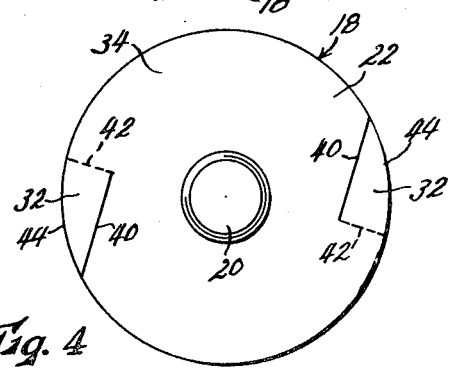
Figure 5:
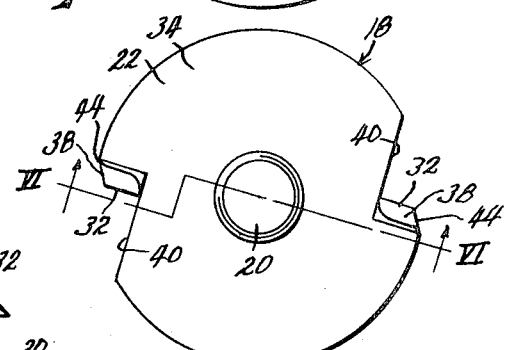
Figure 6:
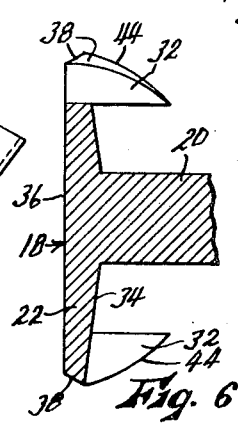

With these objects in view as well as other objects which will appear in the course of the specification, reference will be had to the accompanying drawing, wherein:

FIG. 1 is a side elevational view of a belt conveyor having elevator buckets attached thereto by bolts embodying the present invention, FIG. 2 is a fragmentary face view of the belt as shown in FIG. 1, including a single bucket and its attaching bolts, FIG. 3 is an enlarged fragmentary sectional view taken on line III—III of FIG. 2, with the bolt left in elevation, FIG. 4 is an enlarged end view of one of the bolts, illustrating a preliminary step in the formation of the teeth on the head thereof, FIG. 5 is a view similar to FIG. 4, but showing the teeth completely formed, and FIG. 6 is a fragmentary sectional view taken on line VI—VI of FIG. 5.

Like reference numerals apply to similar parts throughout the several views, and the numeral 2 applies to an endless, flat, flexible conveyor belt which may be formed of rubber, and which usually has plies of textile fabric (not shown) molded therein for strength. The stronger or "warp" threads of the fabric usually extend longitudinally of the belt, while the weaker "weft" threads extend transversely of the belt. Said belt is trained about a pair of vertically spaced apart pulleys 4 and 6 carried respectively on shafts 8 and 10, at least one of which is driven by any suitable power means, not shown, to rotate in the direction of arrows 12. A series of elevator buckets 14 are mounted at intervals along said belt. Said buckets may be of many different configurations, but virtually all such buckets have the characteristics that they open upwardly on the upwardly travelling reach of belt 2, and that each has a generally planar back wall 16 adapted to lie flat against the belt.

Each bucket 14 is attached to belt 2 by a series of bolts 18 embodying the present invention. Said bolts are arranged in a single straight line transversely of the belt in order to minimize any interference thereby with the free flexure of the belt as it passes around pulleys 4 and 6. As best shown in FIGS. 3–6, each bolt 18 includes a threaded shank 20 and a head 22. The shank is inserted through a hole 24 punched or otherwise formed therefor in the belt so as to dispose head 22 at the inner surface of the belt, extends through a hole 26 provided therefor in back wall 16 of the bucket, and is secured by a nut 28 threaded thereon adjacent said back wall, a washer 30 preferably being inserted between said nut and said back wall.

The invention particularly involves the configuration of bolt head 22 and the teeth 32 formed thereon and projecting from said head in the same direction as shank 20. As seen, said head has a large diameter in comparison to the diameter of shank 20, at least several times said shank diameter, in order to give it a broad bearing area for clamping the belt against the bucket wall 16. This broad bearing area is of assistance in preventing the bolt head from pulling through the belt when heavily loaded. The head is of shallow conical form, having a conical inner face 34 with shank 20 extending coaxially from the apex thereof, and a planar outer face 36 normal to the shank axis. This conical shape permits the head to be drawn, by the tightening of nut 26, into embedded or "countersunk" relation to the belt, so that outer face 36 thereof is flush with the inner belt surface. The bolt head will not then interfere with the passage of the belt over its pulleys 4 and 6, and will not damage said pulleys. Furthermore, the conical shape permits the head to be embedded flush in the belt without forcing the belting material to "flow" outwardly from under the head to any such extent as to cause bulging or an uneven contour of the inner belt surface adjacent the bolt, so that the belt can pass smoothly over the pulleys, provided that the angle of a generating line of conical face 34 to the bolt axis is large (at least 80° has been found satisfactory), and provided that the axial thickness of the head is sufficiently small in comparison to the belt thickness (about one-third or less of the belt thickness has been found satisfactory) to avoid over-compression of the belt.

As the belt passes about is pulleys it is of course flexed "inwardly" while the rigid bolt heads of course cannot flex. This tends to pull the belt inwardly around the head, at the leading and trailing edges thereof. This is the previously described "thumbnailing" action, and as described can cause cutting of the belt if the peripheral edge of the head is sharp. To reduce this cutting damage, the planar outer face 36 of the bolt head is conically bevelled about its peripheral edge, as indicated at 38, oppositely to the direction of bevel of inner bolt head face 34. Thus the line of juncture between surfaces 34 and 38, which is the edge of the head bearing most sharply against the belt, is substantially blunted as compared to the sharp edge which would exist if surface 34 merged directly with planar outer face 36, and any cutting of the belt thereby is therefore greatly reduced. It would be possible to blunt this cutting edge still further by rounding it, or by making surface 38 cylindrical instead of conical, but for reasons to be discussed relative to the formation and function of teeth 32, it is desirable that surface 38 be bevelled as shown.

FIG. 4 shows a preliminary step in the formation of teeth 32. Each tooth is formed by first cutting through head 22 inwardly from the periphery thereof along a line 40. Said line should be angled acutely to a line tangent to the periphery of the head at the outer end of the cut, and should be of a length corresponding to the desired extension of the tooth from the general plane of the head (and this must of course be less than the thickness of the belt), and a line at right angles to the inner end of said cut should about intersect the axis of shank 20. With this latter limitation, it will be seen that the desired length of the tooth determines the angle of cut 40 to the periphery of the head. The portion of the head between cut 40 and the adjacent periphery of the head is then bent at right angles along a line 42 generally radial to shank 20, and extending from the inner end of cut 40 to the adjacent periphery of the head, whereby to form a tooth 32 extending in the same direction as shank 20, generally parallel to but spaced apart from said shank. Said teeth are of course driven into penetrating relation to the belt as nut 26 is tightened, as best shown in FIG. 3, and have the general function of preventing rotation of the bolt, either as the bolt is tightened, or in actual usage due to constantly repeated flexures of the belt around the pulleys. Such rotation not only causes wear and destruction of the belt, but can also loosen the nuts permitting relative movement between this bolt and belt which cause still greater belt damage, besides loosening the connection of the bucket to the belt.

Preferably, the bolt head is provided with only two teeth 32, at diametrically opposite sides thereof, and the bolt is preferably arranged when installed so that the teeth 32 of each bolt are spaced apart transversely of the belt, as shown. This arrangement not only tends to prevent relative movement between the teeth and the belt, since the belt flexes very little along the transverse midline of the bolts, but also tends to prevent "splitting" of the warp strands of the reinforcing textile fabric of the belt, if the belt has such reinforcement. The lengthwise or warp strands of the fabric form its major strength, but can be split or spread laterally apart by an object driven therein, in the same manner as a board may be split by a nail driven therein, the warp threads corresponding to the grain of the board. Thus if teeth 32 are spaced apart laterally of the belt, they are far less likely to split the fabric warp than if they were spaced apart longitudinally of the belt, in the same manner that two nails spaced apart laterally of a board are less likely to split the board than two nails equally far apart but spaced longitudinally of the board grain. Such splitting of the belt warp threads is a common source of damage resulting from the use of barbed or toothed bolt heads. The transverse spacing of the teeth also removes the sharp metal edges caused by the cutting of the teeth from the leading and trailing edges of the bolt head, and thus further decreases the "thumbnailing" damage already discussed.

The described method of forming teeth 32, and the resulting configuration of said teeth, has certain functional advantages. It permits the provision of the teeth with no parts required to be welded, molded, or otherwise affixed to the bolt head, said teeth being merely struck from the bolt head and bent in a single economical operation. The length of the teeth may be easily accommodated to the thickness of the belt simply by changing the angle of cuts 40 to the periphery of the head. The teeth formed, while sharply pointed for easy penetration by virtue of the acute intersection of cuts 40 with the head periphery, are nevertheless generally flat and planar, with their planes generally radial to shank 20. Thus they present broad, flat surfaces to the belting material, whereby to resist rotation of the bolt in the belt much more effectively than if said teeth were of thin, spike-like form. The distal longitudinal edges 44 of teeth 32, since they are formed by portions of the former periphery of the head, are of course curved, and as best shown in FIGS. 3 and 6, converge toward the free end of shank 20. Thus as the teeth are driven into the belt, the curved edges 44 exert a tensile stress in the belt diametrically across the hole 24 formed in the belt for the bolt shank. This tends to enlarge hole 24 enough to admit shank 20 freely therein, taking into consideration the fact that said hole must be undersized to provide an eventual very tight fit of the shank therein, and that it is important for efficiency that the belt be fitted snugly about the shank directly against head 22, rather than simply being compressed and never seating firmly about the base of the shank. This "spreading" of hole 24 by the teeth occurs just when needed, during the final penetration of the belt by the teeth. The teeth spread the hole, rather than merely cutting the belt, since the outer edges 44 of the teeth, which apply the spreading force, are not sharp, but generally flat, being formed by the bevelled surface 38 of the head, and are therefore sufficiently blunt to apply the spreading force without immediately cutting the rubber. However, the edges 44 are not precisely normal to a radius from shank 20, but angled to said radius, due to the original taper of bevelled surface 38, as clearly shown in FIG. 5. Thus there is a cutting edge, though blunt, at the extreme outer edge of each tooth, formed at the juncture of surfaces 38 and 34. This cutting edge does not prevent the teeth from temporarily spreading hole 24 at least long enough to insert shank 20 fully therein, but nevertheless will eventually cut the rubber sufficiently to release the spreading force of the teeth, allowing hole 24 to draw tight about the base of the shank. This relief of the spreading force may require a brief period of actual operation of the belt, but will occur within a brief period, and is necessary both to fit the belt tightly about the base of the shank and also to prevent a permanent transverse widening of the belt at the bolt lines. A bevel of surface 38 of about 60 degrees, as shown, has been found satisfactory for this purpose. Any substantially flatter bevelling angle renders the edges 44 so sharp that they immediately slice the rubber with no spreading force being supplied thereby, while any substantially steeper bevel renders the spreading action too permanent and difficult to relieve.

While we have shown and described a specific embodiment of our invention, it will be readily apparent that many minor changes of structure and operation could be made without departing from the spirit of the invention.

What we claim as new and desire to protect by Letters Patent is:

1. A bolt for attaching an elevator bucket to a flexible belt comprising:
   a. a threaded bolt shank,
   b. a nut threadable on said shank,
   c. a generally flat bolt head of comparatively large diameter integral with said shank, the general plane of said head being normal to said shank, and
   d. a plurality of pointed, angularly spaced teeth affixed to the face of said head confronting said shank, said teeth being spaced apart from said shank and extending from said head in the same direction as said shank, each of said teeth being generally planar with its plane disposed generally radially to said shank, each tooth having an inner edge confronting said shank and an outer edge distal from said shank, said outer edge sloping toward said shank in a direction toward the free end of said shank and being of substantial area in a plane normal to a radius line extending therefrom to the axis of said shank, and wherein a line lying in the surface of the outer edge of each of said teeth, and generally parallel to the plane of said head, is disposed at an angle of about 60 degrees to a radius line extending from said surface to the axis of said shank.

* * * * *